(12) United States Patent
Mages

(10) Patent No.: US 8,775,030 B2
(45) Date of Patent: Jul. 8, 2014

(54) VEHICLE SEAT BELT SYSTEM

(75) Inventor: Mark Mages, Alfdorf (DE)

(73) Assignee: TRW Automotive Electronics & Components GmbH, Alfdorf (DE)

( * ) Notice: Subject to any disclaimer, the term of this patent is extended or adjusted under 35 U.S.C. 154(b) by 0 days.

(21) Appl. No.: 13/378,388

(22) PCT Filed: Jul. 10, 2010

(86) PCT No.: PCT/EP2010/004220
§ 371 (c)(1),
(2), (4) Date: Jan. 11, 2012

(87) PCT Pub. No.: WO2011/006626
PCT Pub. Date: Jan. 20, 2011

(65) Prior Publication Data
US 2012/0146384 A1    Jun. 14, 2012

(30) Foreign Application Priority Data

Jul. 17, 2009 (DE) .......................... 10 2009 033 689

(51) Int. Cl.
*B60R 22/48* (2006.01)
(52) U.S. Cl.
USPC ........................... 701/45; 180/268; 280/801.1
(58) Field of Classification Search
USPC ........................... 701/45; 280/801.1; 180/268
See application file for complete search history.

(56) References Cited

U.S. PATENT DOCUMENTS

| | | | | |
|---|---|---|---|---|
| 5,765,116 A * | 6/1998 | Wilson-Jones et al. | ......... | 701/41 |
| 6,470,265 B1 * | 10/2002 | Tanaka | .......................... | 701/532 |
| 7,188,012 B2 * | 3/2007 | Salmeen et al. | ................. | 701/45 |
| 7,343,235 B2 * | 3/2008 | Isaji et al. | ........................ | 701/45 |
| 7,561,951 B2 * | 7/2009 | Rao et al. | ......................... | 701/48 |
| 7,698,037 B2 * | 4/2010 | Odate | .............................. | 701/45 |
| 7,835,865 B2 * | 11/2010 | Okazaki et al. | ............... | 701/300 |
| 7,992,669 B2 * | 8/2011 | Odate et al. | .................... | 180/268 |
| 8,032,284 B2 * | 10/2011 | Hozumi et al. | ................. | 701/49 |
| 2005/0150704 A1 | 7/2005 | Tanaka | | |
| 2006/0047388 A1 * | 3/2006 | Oka et al. | ........................ | 701/41 |
| 2007/0021892 A1 * | 1/2007 | Takemura | ....................... | 701/45 |
| 2008/0119996 A1 * | 5/2008 | Hozumi et al. | ................. | 701/49 |
| 2010/0017060 A1 * | 1/2010 | Zhang et al. | .................... | 701/41 |

FOREIGN PATENT DOCUMENTS

| | | |
|---|---|---|
| DE | 10303148 | 7/2004 |
| EP | 1632400 | 3/2006 |
| EP | 1745995 | 1/2007 |
| EP | 1864867 | 12/2007 |
| WO | 2008/041904 | 4/2008 |

* cited by examiner

*Primary Examiner* — Paul N Dickson
*Assistant Examiner* — Timothy Wilhelm
(74) *Attorney, Agent, or Firm* — Tarolli, Sundheim, Covell & Tummino LLP

(57) ABSTRACT

A vehicle seat belt system includes a reversible belt tensioner (12) adapted to apply a belt tightening force (F) on several predetermined levels to a belt strap (14) of a seat belt, a control unit (16) for controlling the belt tensioner (12) and a device (18) for detecting the course of a road (S1, S2) ahead of the vehicle and for identifying bends lying ahead of the vehicle. The control unit (16) causes the belt tightening force (F) to be kept on an increased level when in the course of the road a further bend follows a just taken bend within a predetermined distance.

12 Claims, 2 Drawing Sheets

VEHICLE SEAT BELT SYSTEM

RELATED APPLICATIONS

This application corresponds to PCT/EP2010/003763, filed Jun. 23, 2010, which claims the benefit of German Application No. 10 2009 030 601.3, filed Jun. 26, 2009, the subject matter, of which is incorporated herein by reference in their entirety.

BACKGROUND OF THE INVENTION

The invention relates to a vehicle seat belt system comprising a reversible belt tensioner adapted to apply a belt tightening force on one or more predetermined levels to a belt strap of a seat belt.

Reversible tensioning of the belt strap is not only used to largely eliminate the belt slack prior to an accident and to prevent the vehicle occupant as far as possible from being displaced forward, but can also fulfill a comfort function and impart more safety to the vehicle occupant by more tense contact of the belt strap in particular driving situations.

The belt tensioners used for this purpose can achieve comparatively smooth and almost unnoticed contact of the belt strap to the body by appropriate control, wherein the belt tightening force can be continuously increased and reduced. Such control is especially interesting during cornering where a comfortable tensioning of the belt fixes the driver in a better way in his seat upon occurrence of transverse accelerations and accordingly conveys improved lateral support.

SUMMARY OF THE INVENTION

It is the object of the invention to provide an improved vehicle seat belt system.

To this end, a vehicle seat belt system includes a reversible belt tensioner adapted to apply a belt tightening force on plural predetermined levels to a belt strap of a seat belt and a control unit for controlling the belt tensioner as well as a device for detecting the course of a road ahead of the vehicle and for identifying bends lying ahead of the vehicle. The control unit causes the belt tightening force to be kept on an increased level when a further bend follows to a just cornered bend at a predetermined distance along the road. The level of force is above the level of force usually applied by the belt tensioner on a straight road. In this way it is achieved that the tensioning always gives the vehicle occupant a safe feeling to even on a winding road.

Due to the anticipating control, for example variations of the level of the belt tightening force along a winding road can be substantially avoided, thus making the vehicle occupant feel safer.

It is also possible by the system according to the invention to obtain sufficient fixing of the vehicle occupant also in a vehicle seat offering rather small lateral support even when taking bends in a sporty manner.

The control unit can be configured so that in response to the detected course of the road it has start the activity of the belt tensioner to increase a belt tightening force before the vehicle is taking a bend. In this manner, the vehicle occupant is fixed more tightly in his seat already before the vehicle enters the bend and a lateral displacement of the occupant due to transverse accelerating forces in the bend is minimized from the start. Conventionally activated belt systems are activated, on the other hand, not before sensors in the vehicle determine that a threshold has been reached. Then the vehicle has already taken the bend, however.

It is advantageous to the vehicle occupant' convenience when the force applied by the belt tensioner is continuously varied. The level of the belt tightening force in this case can be freely adjusted between a minimum and a maximum value.

On the basis of the data of the device for detecting the course of the road, the maximum curvature of the just taken bend and of the following bends in the further road path can optionally be determined. With the knowledge of this maximum curvature, viz. the minimum radius of the respective bend, the optimum value for the belt tightening force and an adapted rate of increase of the belt tightening force can be established and a slower increase in the belt tightening force can be initiated already before entering the bend.

Preferably the device for detecting the course of the road comprises a GPS receiver and map data of the presently taken road, e.g. in the form of a known navigation system. Instead of the GPS data or information, also the corresponding data of another GNSS system (Global Navigation Satellite System) such as Gallileo can be utilized. In this manner, an anticipating evaluation of the course of the road can be easily obtained.

As an alternative or in addition, the device for detecting the road course may include a video camera and means for determining a course of at least one lane marking ahead of the vehicle on the basis of the video data.

Another option for determining the course of the road is resulting, as an alternative or in addition, when the device for detecting the road course includes a LIDAR apparatus and means for determining the course of at least one lane marking ahead of the vehicle on the basis of the LIDAR data.

As the course of the lane marking, for instance an edge strip of the lane or a median strip, usually reflects the road course and a bend curvature quite precisely, the course of the road can be generated from these data with high accuracy.

When the map/GPS data and/or the environment detection indicate that a critical driving situation is ahead, additionally single-step or multi-step measures can be taken in the form of informing the driver, warning the driver and/or of an autonomous intervention in the vehicle conduct.

Warnings or interventions can be performed, for instance, when the current driving speed definitely exceeds the cornering speed of the upcoming bend which is presumably convertible in terms of lateral vehicle dynamics. In this event, the driver's attention will initially be drawn to the situation by information, in the case of ignorance the driver's warning will be intensified and, if the driver still pays no attention to this, the vehicle autonomously intervenes by overriding the engine control and, where necessary, by actively building up brake pressure. Of course, a restriction to one or two or three measures of intervention is possible just as the addition of further steps.

Moreover, it is advantageous to integrate the belt system in the warning and intervention strategy. Since each of the aforementioned situations is a possible critical situation, early and reversible tensioning of the seat belt is useful to restrain the occupant to the seat. Also, the use of the belt is advantageous as part of the driver's warning/driver's information and as an alternative source of perception—not in the acoustic or optical but in the haptic respect—, because this warning is experienced only by the driver but not by further occupants. In this way the driver's warning is prevented from possibly unsettling the other occupants.

BRIEF DESCRIPTION OF THE DRAWINGS

Further features and advantages of the invention are resulting from the following description of an embodiment in connection with the enclosed drawings, in which.

DESCRIPTION OF EXEMPLARY EMBODIMENT

Figure 5:
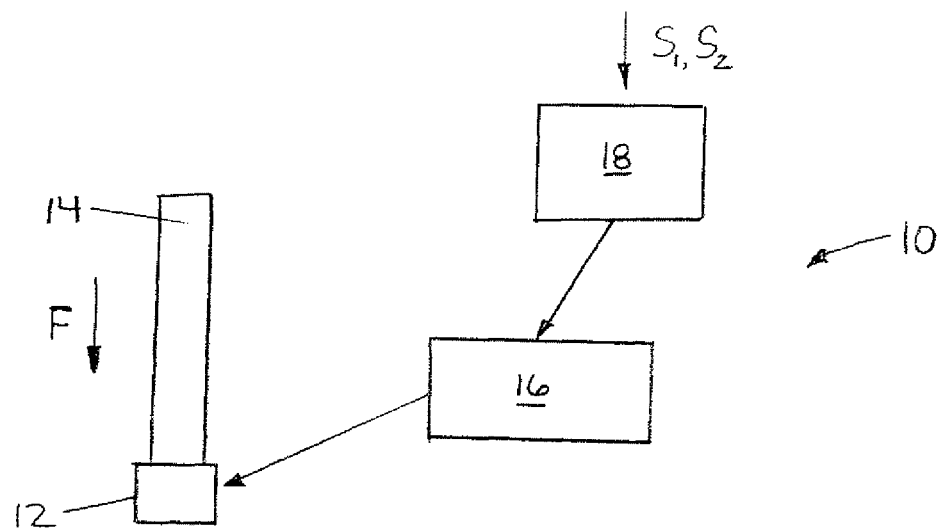
FIG. 5 shows a schematic representation of a vehicle seat belt system according to the invention.

A vehicle seat belt system 10 (schematically illustrated in FIG. 5) includes a reversible belt tensioner 12, for instance in the form of an electric motor coupled to a belt winder adapted to apply a belt tightening force F to a belt strap 14 which is part of a seat belt system of a vehicle (not represented). The belt tensioner 12 is in connection with an electronic control unit 16 adapted to predetermine a force level of the belt tightening force F. The control unit 16 is in turn connected to a device 18 for detecting the course of a road that provides data on the course of the road lying ahead of the vehicle.

Figure 1:
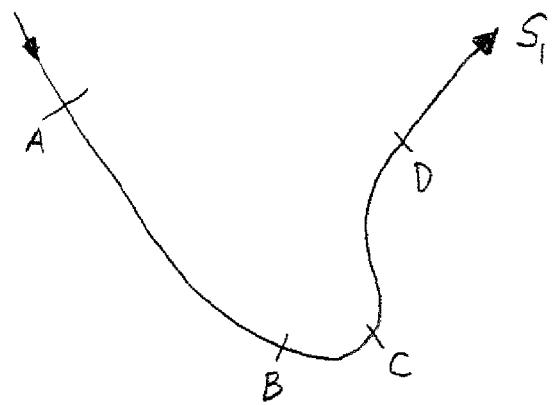
FIG. 1 shows a schematic representation of a hypothetic course of a road with a double-bend.

A first hypothetic road course $S_1$ is represented in FIG. 1.

Figure 2:
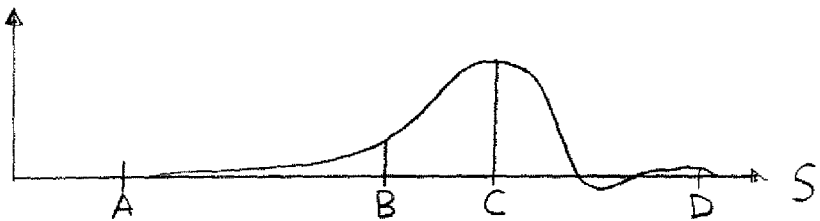
FIG. 2 shows a representation of the course of curvature of the bends of the road of FIG. 1.

The road course $S_1$ shows two bends which are directly following each other, viz. a sharp left turn followed by a flat right turn. Hereinafter the curvature of the first turn is considered to be positive and that of the second bend is considered to be negative. The first turn has the maximum radius of curvature of the entire road course $S_1$ in the point C. The course of curvature of the road $S_1$ is represented in FIG. 2.

The device 18 for detecting the road course identifies the data of the course of the road $S_1$ in advance for instance about 10 to 300 m ahead of the vehicle and transmits them to the control unit 16. For this purpose, the device 18 has a GPS by which the current position of the vehicle can be determined at an accuracy of few meters. The device 18 moreover includes maps from which the road course $S_1$ can be taken. On the basis of the position of the vehicle and the road course $S_1$, the control unit 16 calculates the course of curvature including the point of maximum curvature (in this case point C) as well as a point A which is located ahead of the beginning of the first turn and upon passing of which an increase in the belt tightening force F is supposed to start.

Figure 3:
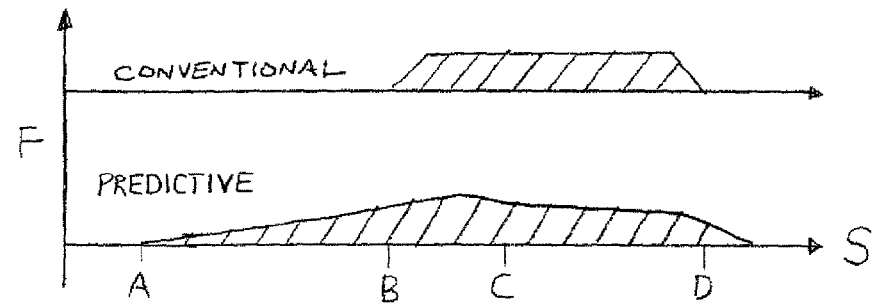
FIG. 3 shows the course of the belt tightening force in a vehicle seat belt system according to the invention and a conventional vehicle seat belt system when following the course of the road shown in FIG. 1.

The lower curve ("predictive") in FIG. 3 shows the course of the belt tightening force F applied in this example by the belt tensioner 12 to the belt strap 14. Upon passing the point A, a slow increase in the belt tightening force F is starting. Any variation of the belt tightening force F is performed continuously and so slowly that it is hardly perceivable by the vehicle occupant and is felt to be convenient in any case. The belt tightening force F is already significantly increased before the vehicle is taking the bend and a lateral acceleration due to the centrifugal forces is imparted to the vehicle occupant. The belt tightening force F reaches its maximum level already before the point of the maximum bend curvature (point C) is reached. Until this point is reached, the belt tightening force F is continuously increased which is also analogous to the increase in the radius of curvature of the just taken bend in this case. In this way the vehicle occupant experiences a compensation of the transverse acceleration forces in the bend and his lateral displacement is minimized. His lateral support in the seat is definitely increased. After passing the point C, the belt tightening force F is gradually reduced in response to the radius of curvature of the bend which now decreases again.

Since the road course ahead of the vehicle is known and thus it is also known that another bend will follow to the just taken bend, the belt tightening force F is kept on an increased level by the control unit 16, until the point D is passed which in the course of the road $S_1$ marks the end of the second bend and after which a straight road section starts.

In a conventional sensor-controlled comfort system as represented in the upper ("conventional") curve in FIG. 3 the increase in the belt tightening force F would not be performed before at the point B a particular threshold of the transverse acceleration has been exceeded already. A conventional system has no possibility, either, to react to the radius of curvature of the bend so that a fixedly preset belt tightening force F is maintained over the entire course of the bend. After falling below the threshold (not marked) the level of the belt tightening force F is still maintained for a predetermined period so as to further give the vehicle occupant the feeling of being safely withheld when leaving the bend.

Figure 4:
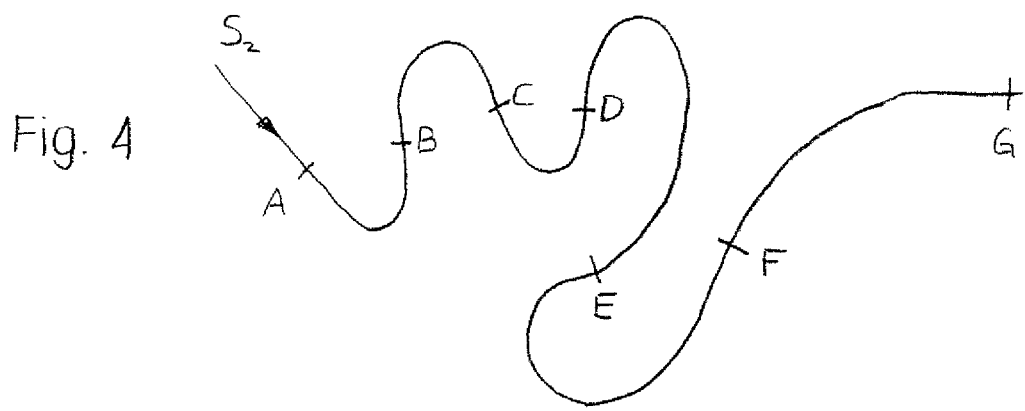
FIG. 4 shows a further hypothetic road course with plural bends.

In FIG. 4 a second hypothetic road course $S_1$ including various sharp turns following each other is shown. In this case, according to the invention the belt tightening force F is increased from the point A before the beginning of the first bend and is reset to the normal level for a straight road without any direct danger to the vehicle again as late as from the point G marking the end of the winding road. The level of the belt tightening force F can be varied in the course of the distance between the points A and G in response to the respective maximum curvature of the just taken bend, but also a constant level can be chosen which is adapted to the maximum degree of curvature of all bends in this road section so as to avoid any variations in the belt tightening force F which might disturb the vehicle occupant.

In addition or as an alternative to the employed GPS and navigation system including road maps, the device 18 can also include a video camera or a LIDAR system (light detection and ranging system) for detecting the road course. The video camera or the LIDAR in this case detect a lane marking, for instance at the roadside or a median strip or else marking poles at the roadside. The control unit 16 calculates the course of the road ahead of the vehicle based on these data. The control of the belt tensioner 12 is then performed as described for the GPS system.

The described system can be combined, as a matter of course, with a control of the belt tensioner 12 based on current driving state parameters such as transverse acceleration or yaw rate.

The invention claimed is:

1. A vehicle seat belt system comprising a reversible belt tensioner (12) adapted to apply a belt tightening force (F) on one or more predetermined levels to a belt strap (14) of a seat belt,
   a control unit (16) for controlling the belt tensioner (12) and
   a device (18) for detecting the course of a road (S1, S2) ahead of the vehicle and for identifying bends lying ahead of the vehicle,
   wherein the control unit (16) causes the belt tightening force (F) to be increased from a first tightening force for a first bend to a second tightening force for a second bend, the second tightening force being greater than the first tightening force, when in the course of the road the second bend follows the first bend within a predetermined distance.

2. The vehicle seat belt system according to claim 1, wherein in response to the detected course of the road (S1, S2) the control unit (16) already causes the belt tensioner (12) to start acting in order to increase the belt tightening force (F) before the vehicle is taking a bend.

3. The vehicle seat belt system according to claim 1, wherein on the basis of the data of the device (18) for detecting the course of the road a maximum curvature of the first and second bends is determined.

4. The vehicle seat belt system according to claim 1, wherein the data from the device (18) for detecting the course of the road are compared to the current driving speed of the vehicle and, based thereon, an achievable transverse acceleration of the vehicle for the first and second bends to be taken is calculated.

5. The vehicle seat belt system according to claim 4, wherein the control unit causes the belt tightening force (F) to be increased when the calculated achievable transverse acceleration of the vehicle exceeds a predetermined value.

6. The vehicle seat belt system according to claim 5, wherein the belt tightening force is increased by at least two successive steps of increasing intensity.

7. The vehicle seat belt system according to claim 1, wherein the device (18) for detecting the course of the road comprises a receiver for GNSS (Global Navigation Satellite System) data and road map data of the currently taken road.

8. The vehicle seat belt system according to claim 1, wherein the device (18) for detecting the course of the road comprises a video camera and means for determining the course of at least one road marking ahead of the vehicle from the video data.

9. The vehicle seat belt system according to claim 1, wherein for detecting the course of the road the device (18) comprises a LIDAR apparatus and means for determining the course of at least one road marking ahead of the vehicle from the LIDAR data.

10. A vehicle seat belt system comprising a reversible belt tensioner (12) adapted to apply a belt tightening force (F) on one or more predetermined levels to a belt strap (14) of a seat belt,
- a control unit (16) for controlling the belt tensioner (12) and
- a device (18) for detecting the course of a road (S1, S2) ahead of the vehicle and for identifying bends lying ahead of the vehicle,
- wherein the control unit (16) causes the belt tightening force (F) to be increased when in the course of the road a further bend follows a just taken bend within a predetermined distance, the belt tightening force (F) being applied by the belt tensioner (12) continuously varies.

11. A vehicle seat belt system comprising a reversible belt tensioner (12) adapted to apply a belt tightening force (F) on one or more predetermined levels to a belt strap (14) of a seat belt comprising:
- a device (18) for detecting the course of a road (S1, S2) ahead of the vehicle and for identifying first and second bends in the road lying ahead of the vehicle; and
- a control unit (16) for determining the distance between the first and second bends lying ahead of the vehicle and increasing the belt tightening force (F) on the belt strap (14) in response to the first and second bends being within a predetermined distance from one another, the control unit (16) determining the increase of the belt tightening force (F) for the first and second bends before the vehicle takes the first bend.

12. The vehicle seat belt system according to claim 11, wherein the control unit (16) increases the belt tightening force (F) on the belt strap (14) prior to the vehicle traveling on the first bend.

* * * * *